US012784247B2

(12) United States Patent
Robertson et al.

(10) Patent No.: US 12,784,247 B2
(45) Date of Patent: Nov. 3, 2026

(54) COORDINATED MOTION METROLOGY WITH POLAR ROSE SCANNING

(71) Applicant: Nanoverse Technologies Ltd, Beaverton, OR (US)

(72) Inventors: William Robertson, Beaverton, OR (US); Jeff Albelo, Beaverton, OR (US); Jared Richter, Beaverton, OR (US); David Lord, Beaverton, OR (US)

(73) Assignee: Nanoverse Technologies Ltd, Beaverton, OR (US)

( * ) Notice: Subject to any disclaimer, the term of this patent is extended or adjusted under 35 U.S.C. 154(b) by 0 days.

(21) Appl. No.: 19/090,333

(22) Filed: Mar. 25, 2025

(65) Prior Publication Data

US 2026/0301206 A1 Oct. 1, 2026

(51) Int. Cl.

| | |
|---|---|
| ***G06T 7/579*** | (2017.01) |
| ***G01B 11/24*** | (2006.01) |
| ***G06T 7/73*** | (2017.01) |
| ***H04N 23/45*** | (2023.01) |
| ***H04N 23/56*** | (2023.01) |
| ***H04N 23/90*** | (2023.01) |

(52) U.S. Cl.

CPC ............. *G06T 7/579* (2017.01); *G01B 11/24* (2013.01); *G06T 7/73* (2017.01); *H04N 23/45* (2023.01); *H04N 23/56* (2023.01); *H04N 23/90* (2023.01); *G06T 2207/10028* (2013.01); *G06T 2207/30148* (2013.01); *G06T 2207/30204* (2013.01)

(58) Field of Classification Search

CPC . G06T 7/579; G06T 7/73; G06T 2207/10028; G06T 2207/30148; G06T 2207/30204; G01B 11/24; H04N 23/45; H04N 23/56; H04N 23/90

See application file for complete search history.

(56) References Cited

U.S. PATENT DOCUMENTS

| | | | | |
|---|---|---|---|---|
| 11,593,919 B2 * | 2/2023 | Lee | ........................ | H04N 23/60 |
| 2026/0002874 A1 * | 1/2026 | Van Brunt | ......... | G01N 21/6489 |

FOREIGN PATENT DOCUMENTS

| | | | | |
|---|---|---|---|---|
| CN | 209028014 U * | 6/2019 | | |
| CN | 119599960 A * | 3/2025 | ............... | G06T 5/20 |
| WO | WO-2020077780 A1 * | 4/2020 | ......... | G02B 21/0072 |

OTHER PUBLICATIONS

Dogru (NPL "Drone Detection Using Sparse Lidar Measurements," IEEE, Apr. 2022) (Year: 2022).*

* cited by examiner

*Primary Examiner* — Shadan E Haghani

(74) *Attorney, Agent, or Firm* — Mark S Hubert

(57) ABSTRACT

A novel BF-DF metrology that employs simultaneous, coordinated motion of the modulator wheel about its A axis, the BF-DF camera shuttering, the metrology chuck rotational (theta) motion about the C axis, and the metrology stage movement in the X, Y or both axes. This coordinated motion allows for a common frame of reference for the point cloud data to be established, wherein each individual data point is assigned a positional coordinate within a positional reference system (X, Y, C). This system allows for repeated scans with the same results, minimalized stitching, higher scanning speed, better resolution and faster back-end data processing, as the precise location of each data point or pixel in the point cloud of pixelated data generated by the BF-DF cameras, is known and can be dimensionally linked to every other data point.

6 Claims, 3 Drawing Sheets

COORDINATED MOTION METROLOGY WITH POLAR ROSE SCANNING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to the surface inspection of Si wafers, semiconductor devices, including microchips and transistors, and more particularly to the technology of bright field-dark field metrology.

BACKGROUND

As semiconductor devices become even smaller and more complex in design, the role of precise surface measurement down to the nanometer scale during semiconductor fabrication to ensure the correct structure and functionality, is paramount. Metrology occurs between the various successive steps of fabrication. As such, it consumes valuable fabrication time.

In Bright Field-Dark Field (BF-DF) metrology, cameras capture a plethora of images as point cloud data. These pixelated images must be stitched together and processed to develop digital data and images useable for detection of surface irregularities or flaws. This involves a computer intense algorithmic and computing process to interlink these images and develop a 3-D mapping of the Si wafer. This processing time could be greatly reduced and the precision of the images produced greatly increased, if each photo or cloud data point were associated with a common frame of reference. With existing metrology systems, scans on the same Si wafer are neither identical nor repeatable. None of the data points can be snapped to a dimensional grid, because there is no XYZ axis data associated with the individual pixel images. They lack a dimensional reference. Current metrology does not have the ability to precisely, positionally link the images and must rely on excess oversampling and slower, less precise methods of processing the data points into useable material.

Henceforth, an apparatus and method for BF-DF metrology that provides for a more precise and quicker scanning, would fulfill a long-felt need in the semiconductor fabrication and inspection industry. This invention utilizes and combines known and new technologies in a unique and novel configuration to overcome the aforementioned problems and accomplish this.

BRIEF SUMMARY

In accordance with various embodiments, a BF-DF metrology apparatus and methodology that provides coordinated motion of the metrology chuck in the C axis (the scan axis), the A axis (modulator wheel rotational axis), the X Y or both axes, and the camera shuttering, is provided.

In one aspect, a BF-DF metrology apparatus and methodology where each captured data point and image in its point cloud, is tagged with positional XYC coordinates and an acquisition time stamp.

In another aspect, a BF-DF metrology apparatus that for each pixelated image acquired (each data point) provides a positional coordinate from a common dimensional frame of reference. This allows for smaller segments of the point cloud data to be parsed/segregated out and processed simultaneously saving time, since all data can easily be linked together later by their positional coordinates.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
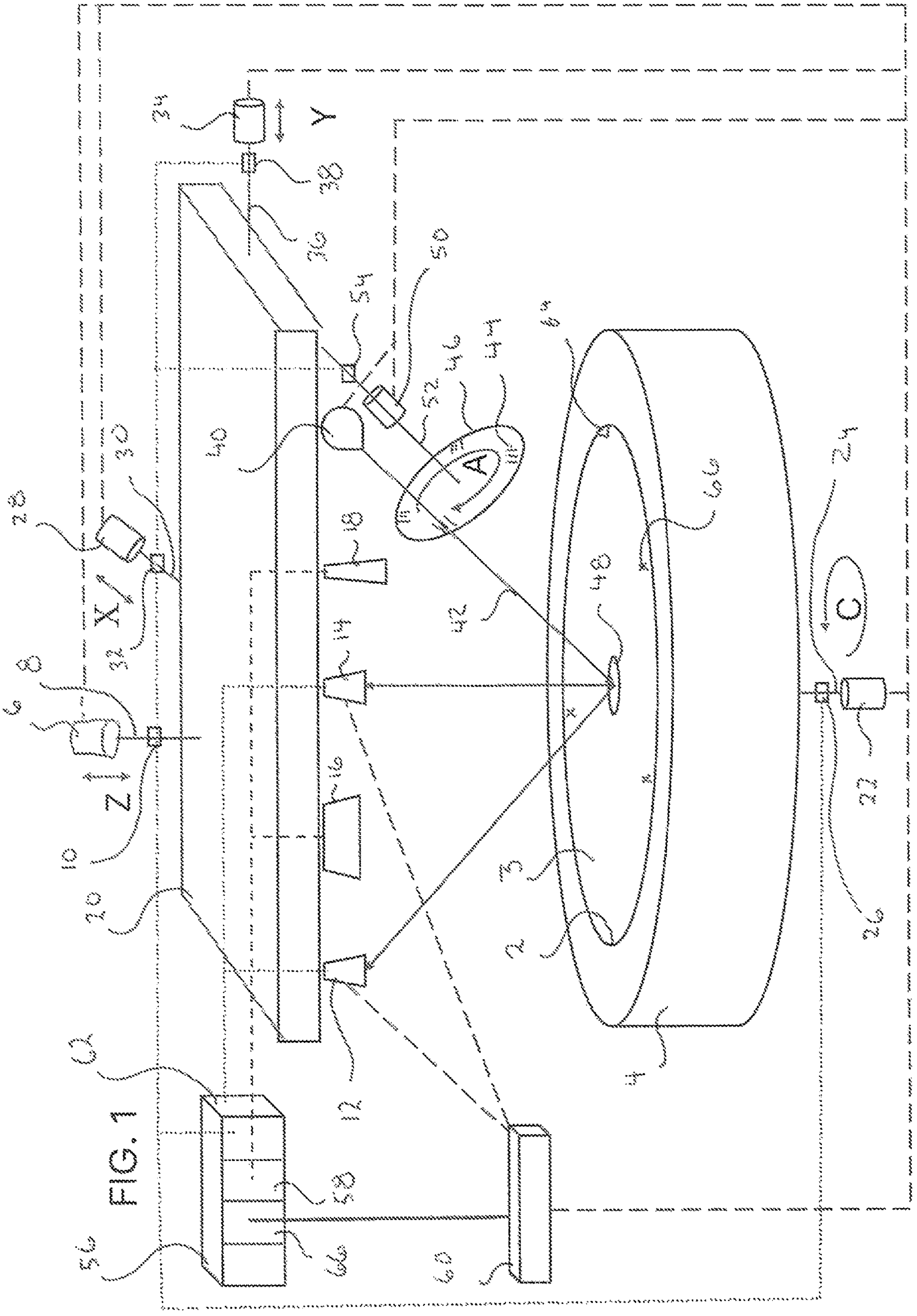
FIG. 1 is a representational image of a coordinated motion BF-DF metrology device used for circular scanning where the metrology stage traverses over only one half of the metrology chuck (as would be used in a smart EFEM)

Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present.

As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items.

A used herein the term "position sensor" refers to any of a plethora of devices that generate and relay data/electrical pulses that allow for the determination of the position (two- or three-dimensional location), and/or velocity (linear or rotational) of the device they are associated with. Commonly, they are connected to the drive motor or motor shaft of the device's prime mover. Devices herein that utilize these position/speed sensors are the A axis drive of the modulator wheel, the X, Y and Z axis drives of the metrology stage or the chuck, and the C axis drive of the chuck. In the preferred embodiment this sensor may be an encoded motor shaft, a Hall effect sensor, a stroboscopic tachometer, or the equivalent, placed on the device or any part thereof its motor assembly.

As used herein, the term "wafer map" refers to a set of instructions showing the location of everything the customer has or is building on a Si wafer. It lays out the grid pattern of the semiconductors or transistors and their parts on the wafer as well as the wafer's edge notches and fiducial markings.

As used herein, the term "BF-DF" refers to bright field-dark field metrology.

As used herein, the term "C axis" refers to the rotational axis (theta) of the metrology chuck that the Si platter resides on for either alignment or scanning.

As used herein, the term "A axis" refers to the rotational axis (theta) of the modulator wheel.

As used herein, the term "coordinate system" refers to an X Y C coordinate where the X and Y are left-handed Cartesian coordinates of the X axis and Y axis of the Si wafer, and the C is the theta rotation of the Si wafer about the Z axis (which is referred to herein as the C axis). It is to be noted the Z axis motor assembly raises or lowers the metrology chuck (or oin some designs, the metrology stage) along the Z axis while the C axis motor assembly rotates the metrology chuck in theta about/around the Z axis.

As used herein, the term "camera shuttering" refers to the operation of the shutter of the line sensor camera to capture of a set of sequential pixelated photos of the area being scanned by the metrology device. A common speed for BF-DF camera shuttering is 300 kHz.

As used herein, the term "approximately" when referring to the pixel array size means the stated size number of pixels plus or minus 30% in length and 300% in height. A standard pixel array of a line scan camera is 16,000 pixel long and 1 pixel high.

As used herein, the term "structured light" refers to a beam of light that has been passed through an optical modulator's grids or slits to project a known pattern of grids or bars onto the Si wafer surface to be examined. These bars deform when striking surfaces on the wafer. Cameras capture reflected or refracted pixelated images of these and a connected computer can algorithmically process these images to produce a three-dimensional picture showing the depth, height and surface information of the surfaces in the scene.

As used herein the term "polar rose" refers to a graph which has the shape of a petalled flower. They are of the form $r=a \sin(n\theta)$ or $r=a \cos(n\theta)$. (Where r is the radial distance, θ is the angle, a determines the size and n determines the number of petals.) If n is odd there are "n" petals and if n is even there are "2n" petals. The petals are evenly spaced about 360 degrees.

As used herein, the term "program speed" refers to the speed of movement of the metrology stage, or the metrology chuck or the modulator wheel when it has accelerated from a standstill and attained a velocity (rotational or linear) at which it will remain constantly while coordinated motion metrology is in progress. The coordinated motion metrology involves the motion of the scan axis (linear motion of the metrology stage or circular motion of the metrology chuck or a hybrid thereof) reaching program speed with the modulator wheel rotation's program speed and the shuttering of the line scan cameras.

The present invention relates to a novel BF-DF metrology that employs simultaneous, coordinated motion of the modulator wheel about its A axis, the BF-DF camera shuttering, the metrology chuck rotational (theta) motion about the C axis, and the metrology stage movement in the X, Y or both axes. This coordinated motion allows for a common frame of reference for the point cloud data to be established, wherein each individual data point is assigned a positional coordinate within a positional reference system (X, Y, C). This system allows for repeated scans with the same results, minimalized stitching, higher scanning speed, better resolution and faster back-end data processing, as the precise location of each data point or pixel in the point cloud of pixelated data generated by the BF-DF cameras, is known and can be dimensionally linked to every other data point.

Looking at FIG. 1 the coordinated motion metrology system for use in circular and polar rose scans (as would be utilized where space is at a premium, such as when performing metrology within an EFEM) can best be seen. The Si wafer 2 resides on top of a rotatable chuck 4. There is a C axis motor assembly (comprising motor 22, mechanical linkage 24 and position sensor 26) enables the theta rotational movement of the chuck 4, around the C axis. It is to be noted that the camera focusing movement of the metrology stage 20 occurs by adjusting the distance between the metrology stage 20 and the metrology chuck 4 along the Z axis and the rotational movement of the metrology chuck 4 occurs around the Z axis at the midpoint of the chuck which herein is designated the C axis.

The metrology stage 20 is suspended above the chuck 4 and has an X axis motor assembly 28, 30 32 that moves the stage 20 (and the devices mounted thereon) in the X axis direction, a Y axis motor assembly 34, 36, 38 that moves the stage 20 in the Y axis direction, and a Z axis motor assembly that moves the stage 20 in the Z axis direction. (All motor assemblies include the motor, the mechanical linkage that enables it to move the connected device, and the position sensor.) The vertical distance or gap between the chuck 4 and the BF camera 12, DF camera 14, and the two area scan alignment cameras (macro camera 16 with a large field of view used for navigation, and micro camera 18 with higher magnification used for wafer alignment) is adjusted along the Z axis to focus the various cameras. The BF and DF cameras 12 and 14 and the two alignment cameras 16 and 18 on the metrology stage 20, are selected to have similar focal lengths allowing each pair to be focused in unison by the Z axis motor assembly. The Z axis motor assembly that adjusts the gap between the metrology chuck and metrology stage to focus the four cameras is connected to the metrology chuck, however in is possible in another embodiment to relocated to the metrology stage to move it to focus the cameras.

The BF and DF cameras 12 and 14 are line scan cameras that capture linear pixelated scan strips of the structured light as it is reflected and refracted off the Si wafer's surface. Preferably, the camera's pixel array is greater than 9000 pixels in length and less than 10 pixels in height, and in the preferred embodiment is approximately 16,000 pixels long and 1 pixel high. These BF-DF cameras are electronically connected to a main computer for the transfer of point cloud data (pixelated image data). The BF-DF cameras are also connected to the motion controller 60, which triggers their shuttering in coordination with the movement of the metrology stage 20 and the passage of structured light 42 through the slits 44 in the modulator wheel 46. In the preferred embodiment, the BF camera 12 collects images reflected at approximately 45 degrees from face 3 of the wafer 2 and the DF camera 14 collects images refracted at approximately 90 degrees from the face 3 of the wafer 2.

The macro camera 16, and micro camera 18 are used for the location and positioning of the Si wafer 4 on the chuck. Their purpose is to provide images of the locating indicia on the Si wafer 2 to the main computer 56.

There is a light source 40 mounted on the metrology stage 20 that projects a structured light 42 through the slits 44 of a modulator wheel 46. In the preferred embodiment this structured light 42 has an elliptical configuration 48 and is collimated in one axis (preferably the X axis) and angled in the other axis (preferably the Y axis). The modulator wheel 46 has a planar configuration with radial slits 44 spaced about its perimeter. The modulator wheel 46 is rotatable about the A axis by the modulator motor assembly 50, 52 54 which is connected to the modulator wheel 46. This elliptical light 42 is projected through the slits 44 on the modulator wheel 46 to provide the elliptical, structured scan light 48 onto the surface of the Si wafer 2 at a scan angle (in the preferred embodiment this is an acute angle).

As noted above, each X, Y, Z, A and C axis motor assembly has an associated motor, 28, 34, 6, 50 and 22, a mechanical linkage 30, 36, 8, 52 and 24 and a position sensor 32, 38, 10, 54 and 26. All position sensors are in communication with and reporting position data in real time to the main computer 56, that can be used to algorithmically determine the position and speed of the associated devices in real time. Knowing these positions, the main computer 56 can algorithmically manage the coordinated motion of the metrology chuck 4 rotation around the C axis as well as the pulsing of the light 42 through the rotation of the modulator wheel 46, by sending C motor assembly, and A motor assembly drive signals to the motion controller 60.

A main computer 56 is in communication with the four cameras and the five position sensors. It has an image processing module 58 that receives pixelated data points of the scanned Si wafer which together form the data point cloud from the BF-DF camera. It receives, algorithmically processes and stores this pixelated data. When processed, this data provides a three-dimensional representation of the wafer 2 and all its semiconductor and transistor components that can be used to verify the integrity of the devices on the wafer.

The main computer 56 also has a coordinated motion module 66 that processes positional and speed data from the position sensors 32, 38, 6, 26 and 38 to use generating signals it sends to the coordinated motion controller 60.

There is a coordinated motion controller 60 connected to the main computer 56, the X, Y, Z, C and A motors assemblies, the BF-DF cameras 12 and 14 and the light source 40. Upon the receipt of a logic instruction/signal from the main computer's alignment module 62 or coordinated motion module 66, the motion controller 60 provides extremely precise coordinated drive signals to the various components to accomplish the following tasks: focus the BF-DF and wafer alignment cameras in the Z axis, align the wafer to its theta reference coordinate position in C axis, drive the metrology stage 20 in the X or Y axes, rotate the modulator wheel 46 in the A axis, turn on/off the light source 40 and operate the shuttering of the BF and DF cameras. During wafer scanning, the coordinated motion controller 60 keeps the motion of the various devices coordinated for the collection of pixelated images that are each related through a common frame of reference.

The main computer 56 has an alignment module 62 that has the customer's wafer map stored therein its memory. This wafer map is provided by the client (the entity having the semiconductors/transistors fabricated on that Si wafer 2) and provides the layout of the wafer showing everything on the wafer and its location. This includes the semiconductors/transistors as well as the positional indicia. These positional indicia may include edge notches 64, fiducial crosses 66 and center markings. The alignment module 62, using the images showing the positional indicia of the Si wafer 2 provided by the area scan alignment cameras 16 and 18, in conjunction with the wafer map, accurately determines the Si wafer's position on the metrology chuck 4. The wafer 2 will not have been placed in its perfect alignment position by the end effectors of the robotic arm that placed the wafer on the metrology chuck 4, although it will be close. Generally, the wafer 2 will be placed in an offset position with respect to the alignment of the center of the Si wafer to the center of the metrology chuck 4 with respect to the X-Y axes or in an angular rotation (theta) in the C axis from its predetermined precise alignment position (the reference position).

For coordinated motion metrology to work, the wafer scan must begin in a common frame of reference with the wafer in its X Y C (0,0,0) positional coordinate reference position where C is the theta rotation about the C axis. The pattern on the wafer 2 must be aligned to the axis of the scanning system. The main computer's alignment module 56 uses the alignment camera's images, to algorithmically generate and provide a drive signal to the motion controller 60 to operate the C axis motor assembly to precisely rotate the metrology chuck 4 to the alignment position, as well as to determine an X-Y offset for the Z axis in the computer software. This offset eliminates the offset of the wafer placement from the center of the chuck and thus can determine the necessary metrology stage's X and Y axis movement instructions sent to the motion controller to compensate for this initial misalignment. This level of positional precision is needed to align the wafer's grid to that of the wafer map. The alignment module 62 is responsible for aligning the wafer 2 to the reference coordinate system.

Once the Si wafer 2 has been precisely placed, adjusted and dimensionally located on the chuck 4, a XYC positional coordinate starting reference position 0, 0, 0 is assigned in the main computer 56. From this point on, with the main computer's coordinated motion of the metrology chuck in the C axis, the metrology stage in the X and Y axis, and in conjunction with the shuttering of the BF-DF line scan cameras, coincident with the passage of the structured light through the modulator wheel slits 44 onto the scan surface of the Si wafer, each of the data points in the point cloud of captured pixelated images from the BF-DF cameras that is provided to the main computer, is linked to a positional coordinate system based on a known reference position (0, 0, 0). Simply stated, the main computer will now know what location on the Si wafer the structured light shone when each reflected or refracted pixilated image was captured by the BF-DF line scan cameras.

With the wafer 2 linked to the known positional (coordinate) reference frame, scanning the wafer while dynamically coordinating the metrology chuck's C axis theta rotation, the X or Y axis metrology stage position or linear movement, the A axis rotational speed of the modulator wheel 46, and the shuttering of the BF-DF line scan cameras 16 and 18, allows a precise three-dimensional imaging of the Si wafer's surface to be processed that requires a minimal, if any, photo data stitching. This coordinated motion and data acquisition provides a much more precise imaging, allows scanning to proceed at a faster rate, allows the image date to be parsed out in smaller bundles for simultaneous processing, and allows for a narrower field of view from the BF-DF cameras. All which add up to a much faster, more precise data processing to generate the Si wafer's surface mapping.

In general terms of operation, after the wafer is precisely rotationally located in theta on the chuck 4, and the dimensional offset has been determined with the compensating positional coordinates input to the computer's software, circular scanning can begin. This scanning can be performed in different ways.

Figure 3:
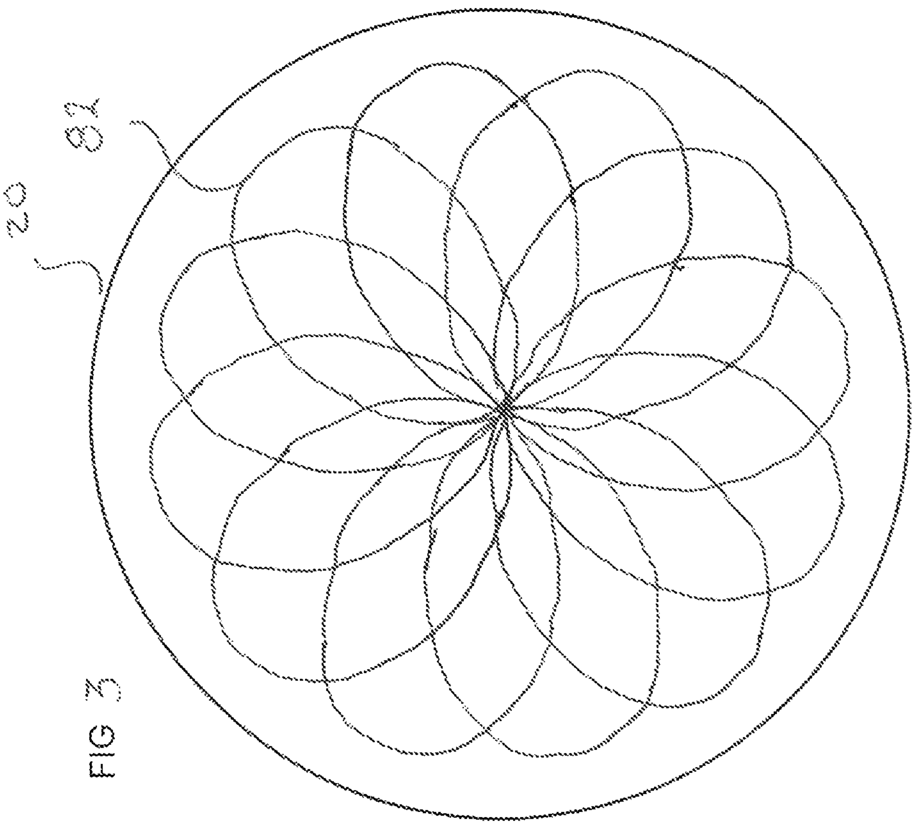
FIG. 3 is a top view showing a partial polar rose scanning pass of the coordinated motion BF-DF metrology device.
Figure 2:
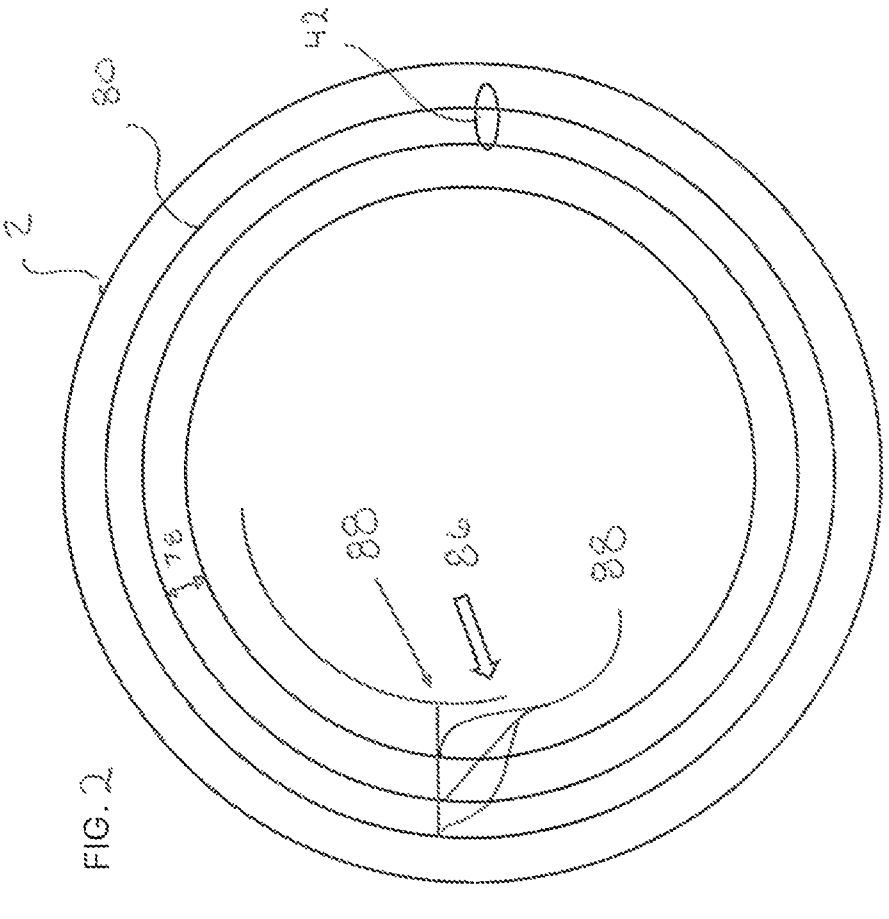
FIG. 2 is a top view showing a partial circular scanning pass of the coordinated motion BF-DF metrology device showing the start, stop and pre scan run up scanning path locations.

In the first embodiment, the scanning will entail a series of concentric 360-degree circular scans that will sample the entire wafer 2. (See FIG. 2) The second embodiment will perform a circular scan 80 while the metrology stage 20 moves in the Y axis to form an inward spiral pattern. The third embodiment involves a circular scan in the C axis while moving the metrology stage in the Y axis radially inward and outward between the center of the Si wafer and the edge of the Si wafer to form a polar rose pattern 82. (See FIG. 3) It is important to note that when metrology scans are performed with a moving chuck, the stage need only traverse above one half of the wafer 2. The stage only must traverse between the outer perimeter of the wafer to the wafer's midpoint to have the scan cover the entire wafer. This is a critical feature for metrology in locations where space is at a premium. Such a location would be within an Equipment Front End Module (EFEM) at a semiconductor fabrication facility.

In the first circular scanning method, the metrology stage may be fixed at the reference location and the metrology chuck rotated 360 degrees per scan. The metrology stage may then be moved in the Y axis an amount slightly less than the width of the light's ellipse 42 on the wafer 2 to compensate for the field of view of the BF-DF cameras from the scan. The circular scan will then be repeated with the metrology stage incrementally repositioned in the Y axis followed by metrology chuck C axis rotation, until the metrology stage 20 reaches the center of the wafer. The second circular scanning method differs from the first only in that the Metrology stage is moved in the Y axis coincident with the rotation of the metrology chuck in the C axis. This method only requires one pre scan runup at the start of the scanning as the entire scan will proceed in a single motion, much loke the playing of a phonograph record.

It is important to note that when metrology scans are performed in a circular fashion with a moving chuck, the stage need only traverse above one half of the wafer 2. The stage only must traverse between the outer perimeter of the wafer to the wafer's midpoint to have the scan cover the entire wafer. This is a critical feature for metrology in locations where space is at a premium. Such a location would be within an Equipment Front End Module (EFEM) at a semiconductor fabrication facility.

To ensure precise, repeatable scans within a few pixels, regardless of which scanning method is employed, there cannot be any mechanical variation in the speed of the C axis rotational movement of the metrology chuck 4, the rotational speed of the modulator wheel 46 and the linear motion in the X and or Y axes of the metrology stage. The Since the BF-DF camera shuttering is purely electronic, the shuttering has immediate precision timing control by the computer/motion controller. It is imperative that all the coordinated motion does not slip out of synchronization as to do so would lose the ability for the scan image pixels to be precisely located with respect to the positional frame of reference. However, the motor assemblies cannot instantaneously bring their driven devices to their desired operating speeds and must go through an acceleration phase before being stabilized at this desired operating speed. This acceleration phase of the metrology would take the movement of the metrology stage, the modulator wheel and the BF-DF shuttering, out of coordinated motion. To avoid this, there is a pre-scan runup position 86 at the start of any C axis circular path scan 80 that is backed up in the circular scan path 80 behind the Y axis scan start position 88 (the reference position). The modulator wheel 46 is similarly placed in its pre scan runup position a short rotational distance in the A axis in front of its scan start position. The metrology stage is similarly backed up to a pre scan runup position in the X axis or the Y axis. The motion controller 60 initiates the C axis motor 22, the A axis motor 50 and the X or Y axis motors, and by the time the metrology chuck, the metrology stage and the modulator wheel reach their scan start positions, they are up to program speed. As they reach their scan start positions, stabilized at their full operating (program) speeds, the light source 40 is switched on to provide elliptical structured light 42 through the slits 44 in the modulator wheel 46 to provide the elliptical light 48 at the scan start position of the wafer, and simultaneously the shuttering of the BF-DF cameras begins to collect the reflected and refracted images.

In the third method of scanning, (polar rose scanning) a pattern is selected from the general form $r=a \sin(n\theta)$ or $r=a \cos(n\theta)$ that utilizes a number of petals evenly spaced about the 360 degrees of the Si wafer, but that have no scan points further apart from another scan point than the length of the line scan of the BF-DF cameras. (approximately 16,000 pixels). In this way, upon completion of the polar rose scan the entire surface of the Si wafer has been scanned and the images may be algorithmically adjusted to compensate for scan overlap. The importance of this type of scan is two-fold. First, it requires but a single continuous scan, and second it need only involve the metrology stage's movement over one half of the Si wafer.

The metrology chuck 4 rotates in the C axis while the metrology stage 20 traverses back and forth in the Y axis between the center of the Si wafer and the edge of the Si wafer. This necessitates pre scan runups of the metrology stage in the Y axis Both directions), a pre scan runup in the C axis, and a pre scan runup in the A axis. The source light 40 and the camera shuttering will also be switched off until the A axis, C axis and Y axis motors reach program speed and pass through the scan start location for that pass. This type of scanning produces a polar rose pattern 82 (See FIG. 3)

Figure 4:
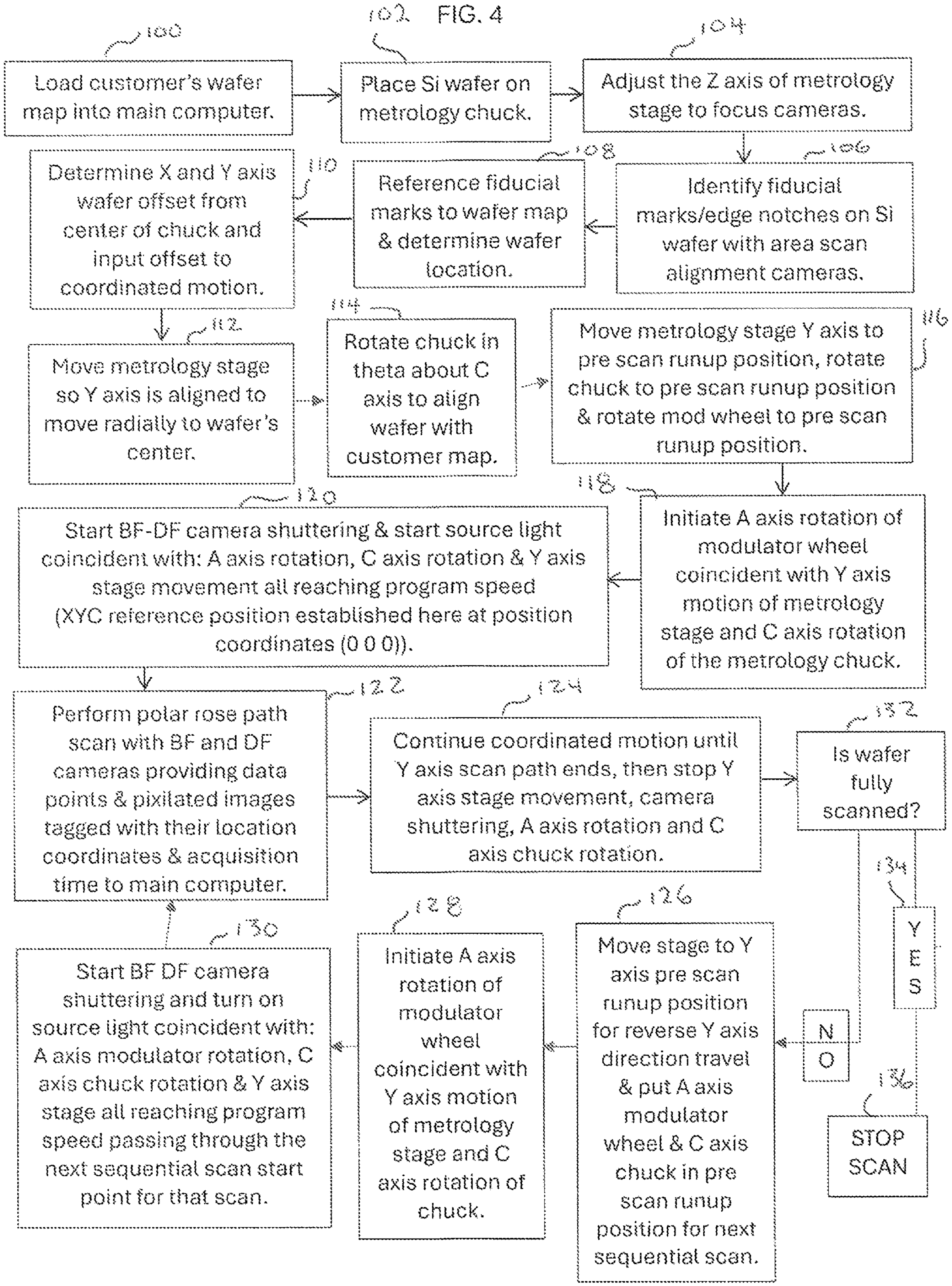
FIG. 4 is a flow chart showing the methodology of conducting a polar rose scan on a coordinated motion BF-DF metrology device.

Looking at FIG. 4 the steps in the methodology of conducting polar rose coordinated motion metrology scanning can best be explained. They are as follows:

The customer's wafer map is loaded into the main computer for use in the alignment of the Si wafer to the reference coordinate system. 100 The robotic arm uses its end effectors to place the Si wafer in the metrology chuck. 102 The Z axis of the metrology stage is adjusted to focus the distance between the Si wafer and the alignment and BF-DF cameras. 104 The alignment cameras provide images to the main computer's alignment module that searches and identifies positional indicia on the Si wafer, such as fiducial crosses, edge notches, center markings. 106 The main computer determines the precise location of the Si wafer on the metrology chuck by referencing the recognized positional indicia to those on the wafer map. 108 The main computer algorithmically determines the Si wafer's X-Y offset from the center of the metrology chuck and provides this input to the coordinated motion module. 110 The main computer provides a signal to the coordinated motion controller to rotate the metrology stage's Y axis for radial movement with respect to the Si wafer. 112 The main computer provides a signal to the coordinated motion controller to rotate the metrology chuck in theta (the C axis) to align the Si wafer with the wafer map. 114 The main computer's coordinated motion module provides a signal to the motion controller that drives the Y axis motor assembly to move the metrology stage to the pre scan runup start position for the Y axis scan path. 116 The main computer's coordinated motion module provides a signal to the motion controller that drives the A axis motor assembly to rotate the modulator wheel to its pre scan runup start position. 116 The motion controller starts the C axis motor assembly and the A axis motor assembly initiating their pre scan runups. 118 The light source is turned on simultaneously with the start of the camera shuttering when the metrology stage reaches its C axis scan start position (reference point) at program speed coincident with the modulator wheel reaching its scan start position at program speed. (This is the start of coordinated motion metrology.) 120 A polar rose scan is performed with the BF and DF line scan cameras acquiring images/point data with their associated positional coordinate location and time. The line scan cameras provide this point cloud data to the main computer for processing and storage. 122 When the Y axis scan reaches the limit of its radial scan path on the Si wafer, the light source, the modulator wheel, the camera shuttering and the Y axis motor assembly are turned off. (Coordinated motion ends.) 124 The motion controller moves the stage in the Y axis pre scan runup position for reverse direction travel. 126 The motion controller jogs the A axis motor assembly and C axis motor assembly to put the modulator wheel and chuck into their pre scan runup positions. 126 The motion controller initiates the modulator wheel rotation, the metrology chuck's C axis movement and the metrology stage's Y axis travel. 128 The light source is turned on simultaneously with the start of the camera shuttering when the metrology stage reaches its Y axis scan start position (reference point) at program speed coincident with the modulator wheel reaching its scan start position at program speed and the metrology chuck reaching program speed at its scan position. 130 (This is another start of polar rose coordinated motion metrology in a reverse Y axis scan path.) A polar rose scan is performed with the BF and DF line scan cameras acquiring images/point data with their associated positional coordinate location and time. 122 The line scan cameras provide this point cloud data to the main computer for processing and storage. 122 When the Y axis scan reaches the limit of its radial scan path on the Si wafer, the light source, the modulator wheel, the camera shuttering and the Y axis motor assembly are turned off. (Coordinated motion ends.) 122 Repeat the last five steps 126 128, 130, 122 and 124 until the wafer is fully scanned. 132, 134 and 136.

In conventional BF-DF metrology systems the X axis metrology stage would trigger the camera shuttering, but the positions were not coordinated, thus if the wafer was scanned multiple times, the same scanned feature part of the wafer would appear in different images each time because there was no positional reference point linked to an established positional frame of reference. The measurements were thus impossible to repeat because in each scan the position of the feature in the pixelated image frame would shift because of the different, non-coordinated positions of the X axis and the modulator wheel's angle as the image was acquired. This type of scanning would then require excessive oversampling, excessive algorithmic processing and image stitching to create a crude representational image of the Si wafer's surface.

Although not disclosed herein, there are other BF-DF metrology circular scan patterns that can be accommodated by this system. There can be an X axis movement of the stage, or a combined X axis and Y axis movement of the metrology stage coordinated with the C axis rotation of the metrology chuck. The advantages of each system resides in their ability to scan the Si wafer at a faster pixel acquisition rate and, simplify or minimize the algorithmic photo stitching, to reduce the computer processing time and to provide cleaner data points.

With the coordinated motion BF-DF metrology scans completed, there can be a three-dimensional profile created in both visual images and point data in XYC coordinate mapping of specific areas of the wafer that can be evaluated for their Z axis height profiles to find defects and irregularities. With the location of each pixelated data point known in relation to a reference coordinate on the wafer, the raw data that is collected has both a high image quality (since shuttering occurs only when the source light is fully shining through the modulator wheel's slits) and a high location precision This allows the oversampling of the pixelated data to be shortened. Preliminary testing shows this may be reduced from the 16,000-pixel array to 9,000 pixels. Stitching is almost eliminated and the computational time to process the three-dimensional wafer image is shortened and can be parsed out in smaller data parcels for simultaneous processing because of the positional knowledge that accompanies each image scan simplifies the connection of all the data points (pixelated data) in the data cloud into a precise three-dimensional image.

The main computer and motion controller as described herein, and illustrated in the drawings, are described in terms of functional blocks, units and/or modules. Those skilled in the art will appreciate that these modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the modules being implemented by microprocessors or similar, they may be programmed using software (e.g., microcode) to perform various functions discussed herein and may optionally be driven by firmware and/or software. Alternatively, modules may be implemented by dedicated hardware, or as a combination of dedicated hardware to perform some functions and a processor (e.g., one or more programmed microprocessors and associated circuitry) to perform other functions. Also, each module of the embodiments may be physically separated into two or more interacting and discrete modules without departing from the scope of the inventive concepts. Further, the modules of the embodiments may be physically combined into more complex modules without departing from the scope of the inventive concepts.

Typically, the main computer and motion controller include a system bus to which is attached processors, memory, e.g., random access memory (RAM), read-only memory (ROM), or other state preserving medium, storage devices, a video interface, and input/output interface ports. They can be controlled, at least in part, by input from conventional input devices, such as keyboards, mice, etc., as well as by directives received from another computer or device, feedback, or other input signal. As used herein, the term "main computer" is intended to broadly encompass a single computer or a system of communicatively coupled computers, microprocessors or microcontrollers or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The main computer and motion controller can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long-range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment and stored locally and/or remotely for machine access.

Embodiments of the invention may include a non-transitory machine-readable medium comprising instructions executable by one or more processors, the instructions comprising instructions to perform the elements of the embodiments as described herein.

While certain features and aspects have been described with respect to exemplary embodiments, one skilled in the art will recognize that numerous modifications are possible. Moreover, while the procedures of the methods and processes for building, assembling and using the devices described herein are described in a particular order for ease of description, unless the context dictates otherwise, various procedures may be reordered, added, and/or omitted in accordance with various embodiments. What is claimed as the invention, therefore, is all such modifications as may come within the scope and spirit of the following claims and equivalents thereto.

Having thus described the invention, what is claimed as new and desired to be secured by Letters Patent is as follows:

1. A method for a polar rose coordinated motion bright field camera-dark field camera scanning metrology, comprising the steps of:

loading a wafer map of the Si wafer to be scanned into the main computer for use in the alignment of said Si wafer to a reference coordinate system;

robotically placing a Si wafer on a metrology chuck;

focusing at least one alignment camera and a bright-field camera and a dark-field camera located above said metrology chuck;

algorithmically determining a location of the Si wafer on the chuck determined within a predefined positional tolerance, by referencing at least one of a positional indicia shown on said at least one alignment camera to corresponding positional indicia on said wafer map;

algorithmically determining the Si wafer's X-Y offset from a center of said metrology chuck;

rotating said metrology chuck about the C axis to align the Si wafer with the wafer map;

positioning said metrology stage above said chuck at a scan start reference position for a polar rose scan;

assigning this scan start reference position in the main computer as the X, Y, C, (0,0,0) positional coordinate;

rotate said metrology chuck to a pre-scan runup start position for a polar rose scan about said C axis;

move said metrology stage in Y axis to a pre-scan runup start position for a polar rose scan;

rotate a modulator wheel to its pre-scan runup start position;

Initiating a pre scan runup of said metrology chuck, said metrology stage and said modulator wheel, powering on a light source simultaneously with the start of a bright-field camera shuttering and a dark-field camera shuttering when said metrology chuck, said metrology stage and said modulator wheel reach a program speed to effect polar rose coordinated motion metrology;

performing said coordinated motion scan of said Si wafer with the BF line scan camera and dark-field line scan camera acquiring scan images and providing them to said main computer;

stopping said circular coordinated motion scan after said metrology stage has traversed to a center within a predefined radial tolerance on said Si wafer;

rotating said metrology chuck to a pre-scan runup start position for a polar rose scan about said C axis;

moving said metrology stage in Y axis to a pre-scan runup start position for a polar rose scan and reverse direction of travel;

rotate a modulator wheel to its pre-scan runup start position;

initiating a pre scan runup of said metrology chuck, said metrology stage and said modulator wheel, powering on a light source simultaneously with the start of said bright-field camera shuttering and a dark-field camera shuttering when said metrology chuck, said metrology stage and said modulator wheel reach a program speed to effect polar rose coordinated motion metrology;

performing said coordinated motion scan of said Si wafer with the bright-field line scan camera and the dark-field line scan camera acquiring scan images and providing them to said main computer;

performing repeated polar rose patterned coordinated motion metrology scans until said Si wafer is fully scanned;

processing said acquired polar scan images, algorithmically linking said scan images to positional coordinates to develop a three dimensional topographical map of said Si wafer.

2. The method for polar rose coordinated motion bright field-dark field scanning metrology of claim 1 wherein said light source is an elliptical light beam having a first axis that is collimated and a second orthogonal axis that is angled.

3. A method for a polar rose coordinated motion bright-field camera and dark-field camera-scanning metrology, comprising the steps of:

locating a Si wafer on a metrology chuck;

rotating said Si wafer on said metrology chuck and positioning a metrology stage over said Si wafer to position said Si wafer in a scan start reference position;

assigning said scan start reference position a positional coordinate in a main computer as X Y C (0, 0, 0);

performing a bright field camera and a dark field camera metrology scan while coordinating the motions of a modulator wheel rotation in an A axis, said metrology stage in a scan axis, and the shuttering of said bright field camera and said dark field camera to acquire polar rose patterned scan images;

processing said acquired polar rose patterned scan images, algorithmically linking said polar rose patterned scan images to positional coordinates to develop a three-dimensional topographical map of said Si wafer.

4. A method for a polar rose coordinated motion bright-field camera and dark-field camera-scanning metrology, comprising the steps of:

locating a Si wafer on a metrology chuck;

rotating said Si wafer with said metrology chuck on a moveable stage, and positioning a metrology stage over said Si wafer to position said Si wafer in a scan start reference position;

assigning said scan start reference position a positional coordinate;

synchronizing coordinated motions of a modulator and said metrology stage with a shuttering of said bright field camera and a shuttering of said dark field camera;

performing a polar rose patterned metrology scan using both a bright-field camera and a dark-field camera processing bright field camera and dark field camera acquired images from polar rose scan algorithmically linking said acquired images to positional coordinates to develop a three-dimensional topographical map of said Si wafer.

5. A method for a polar rose coordinated motion bright-field camera and dark-field camera-scanning metrology, comprising the steps of:

locating a Si wafer on a chuck of X-Y stage;

rotating said Si wafer on said metrology chuck and positioning said bright field camera and said dark field camera above said Si wafer to position said Si wafer in a scan start reference position;

assigning said Si wafer a scan start reference position with an X,Y,Z positional coordinate;

performing a polar rose patterned metrology scan using said bright-field camera and said dark-field camera; and wherein a shuttering of said bright-field camera and said dark-field camera acquires complementary image data from said polar rose patterned metrology scan while operating in synchronized motion coordination with a modulator and said X-Y stage;

processing acquired said complementary image data and algorithmically linking said scan images to said positional coordinates to develop a three-dimensional topographical map of said Si wafer.

6. A method for a polar rose coordinated motion bright-field camera and dark-field camera-scanning metrology, comprising the steps of:

locating a Si wafer on a chuck of X-Y stage;

rotating said Si wafer on said metrology chuck and positioning said bright field camera and said dark field camera above said Si wafer to position said Si wafer in a scan start reference position;

assigning said Si wafer a scan start reference position with an X,Y,Z positional coordinate;

performing a polar rose patterned metrology scan using said bright-field camera and said dark-field camera wherein the all positions of a top surface of said Si wafer are directly scanned; and wherein a shuttering of said bright-field camera and said dark-field camera acquires complementary image data from said polar rose patterned metrology scan while operating in synchronized motion coordination with a modulator and said X-Y stage;

processing acquired said complementary image data and algorithmically linking said scan images to said positional coordinates to develop a three-dimensional topographical map of said Si wafer.

* * * * *